United States Patent
Soderberg et al.

(10) Patent No.: US 6,209,188 B1
(45) Date of Patent: Apr. 3, 2001

(54) FLEXIBLE TOOLING METHOD

(75) Inventors: Mark S. Soderberg, Issaquah; Robert A. Starr, Auburn; Larry R. Cook, Woodinville; Robert J. Thomas, Seattle, all of WA (US)

(73) Assignee: CNA Manufacturing Systems, Inc., Woodinville, WA (US)

( * ) Notice: Subject to any disclaimer, the term of this patent is extended or adjusted under 35 U.S.C. 154(b) by 0 days.

(21) Appl. No.: 08/978,980

(22) Filed: Nov. 26, 1997

Related U.S. Application Data

(62) Division of application No. 08/520,446, filed on Aug. 29, 1995, now Pat. No. 5,722,646.

(51) Int. Cl.$^7$ ...................................... B23Q 3/10
(52) U.S. Cl. ..................... 29/559; 269/20; 269/266; 269/329
(58) Field of Search ................. 269/20, 21, 77, 269/266, 267, 289 R, 329; 29/559; 279/3, 4.03, 4.07, 2.02, 2.07

(56) References Cited

U.S. PATENT DOCUMENTS

| | | |
|---|---|---|
| 3,542,354 | 11/1970 | Fitzpatrick . |
| 3,853,313 | 12/1974 | Appenzeller et al. . |
| 4,080,716 | 3/1978 | Vom Dorp . |
| 4,088,312 | 5/1978 | Frosch et al. . |
| 4,317,577 | 3/1982 | Camerron . |
| 4,432,559 | 2/1984 | Rasmussen . |
| 4,684,113 | 8/1987 | Douglas et al. . |
| 5,163,793 | 11/1992 | Martinez . |
| 5,230,594 | 7/1993 | Pilkington . |
| 5,364,083 | 11/1994 | Ross et al. . |
| 5,372,357 | 12/1994 | Blaimschein . |
| 5,457,868 | 10/1995 | Blaimschein . |
| 5,546,784 | 8/1996 | Haas et al. . |
| 5,551,677 | 9/1996 | Puettmer et al. . |
| 5,562,276 | 10/1996 | Blick . |

OTHER PUBLICATIONS

ETP Hydro–Grip brochure, publication date unknown—believed to be circa 1993 or 1994.
Stover, "A new edge on cutting: Machines made specially for carving composites", High–Performance Composites, Jan/Feb. 1995, pp. 23–26.

*Primary Examiner*—Robert C. Watson
(74) *Attorney, Agent, or Firm*—Dellett and Walters

(57) ABSTRACT

A flexible tooling system includes a support table with multiple openings adapted to removably accept a self-contained actuator. Each opening of the support table provides vacuum and air supply lines as well as a bus interface so that each position may be uniquely addressed and commanded separately from any other openings. The self-contained actuator has corresponding connectors for receiving the vacuum and air supply as well as for interfacing with the bus. An actuator may be placed at a particular location by insertion into the receptacle at the opening in the support table aperture. The actuator may be commanded to raise, lower, lock in position and supply vacuum separate from any other actuator.

11 Claims, 15 Drawing Sheets

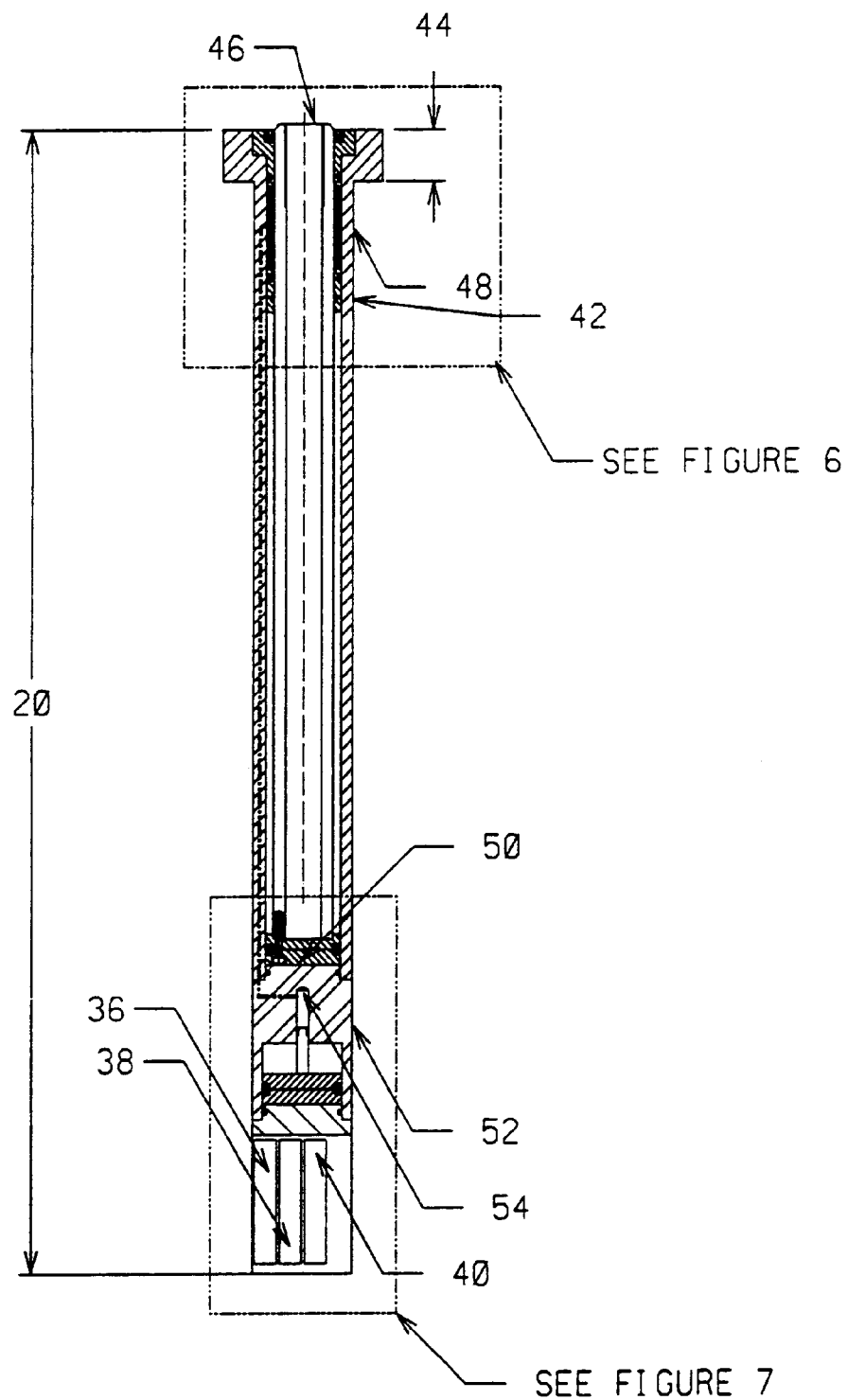

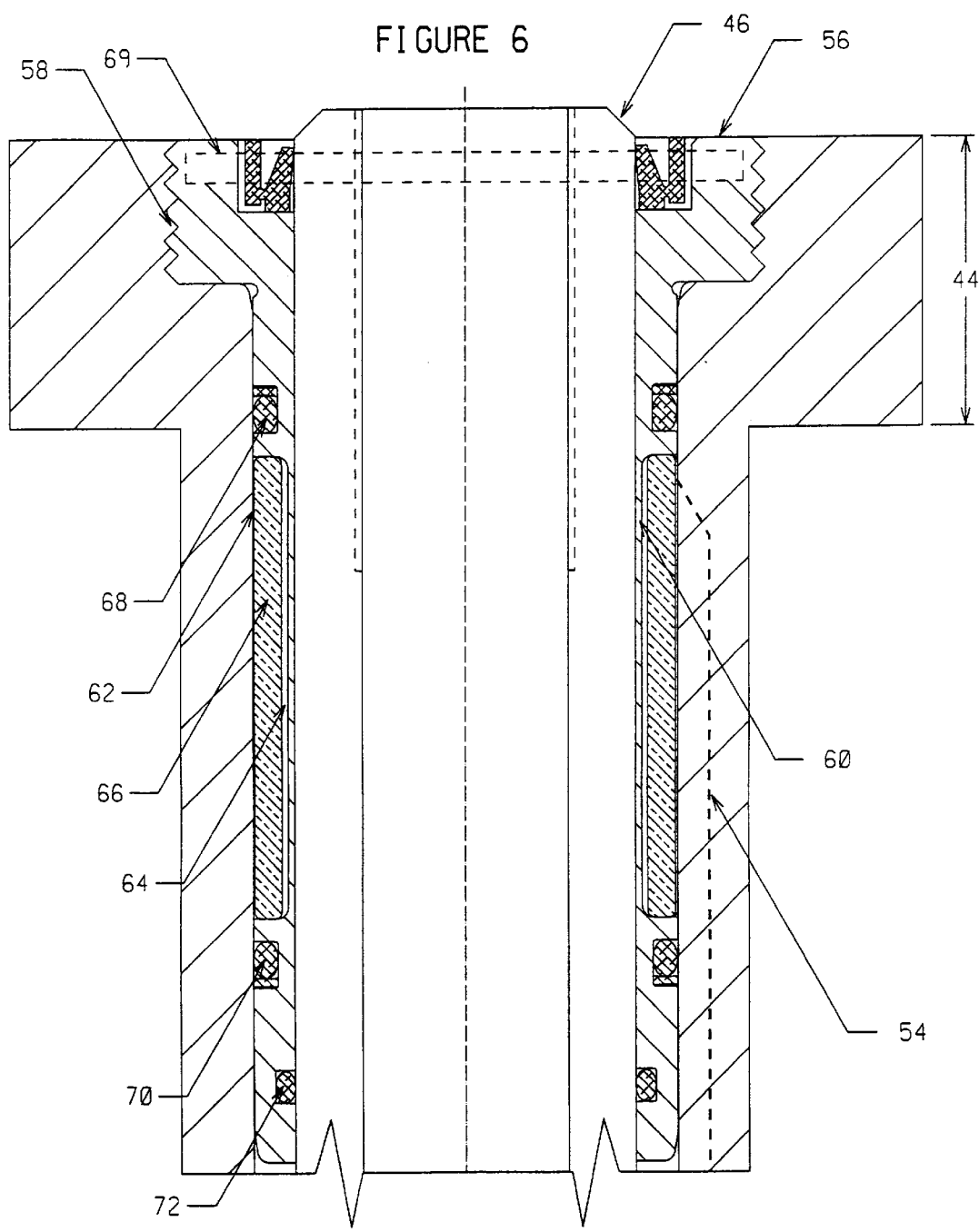

FLEXIBLE TOOLING METHOD

This is a divisional of application Ser. No. 08/520,446, filed on Aug. 29, 1995 now U.S. Pat. No. 5,722,646.

BACKGROUND OF THE INVENTION

This invention relates to machine tools and more specifically to a flexible tooling apparatus for providing a support deck for use with machine tools or assembly tools for processing materials.

When machining material with machine tools or assembly material for fastening, it is necessary to provide a support system for the material being machined or operated upon. In the past, such supports have comprised a tooling support which substantially conforms to the three-dimensional shape of the part or item being processed. The design, fabrication and storage of such tooling supports can become prohibitive. A separate tooling support is required for each uniquely shaped item being processed. Often the setup time and effort to prepare and position the tooling die becomes greater than the time involved in actual machining or processing of the part.

To resolve some of the drawbacks of the fixed tooling die situation, variable tooling supports have been developed, for example, as described in U.S. Pat. No. 5,372,357, wherein a plurality of spaced supports are provided in fixed relation to one another and the supports are adjusted heightwise to support the workpiece at certain points. The workpiece is then either clamped to the supports or the supports provide some sort of clamping through the use of vacuum at the suction cups, for example.

Heretofore, these systems have been quite expensive and complex with a large number of interactions required to provide the appropriate control and power to cause the raising and lowering, as well as the application of vacuum to each of multiple support members. Variable systems which allow movement of the support stanchions in a horizontal plane, as well as the vertical extension thereof, provide even further difficulties given that control wires, power wires and hydraulic or pneumatic or vacuum supply lines are required to also be movable. Maintenance costs related to such systems can be quite high. Over the useful life of such an apparatus, the potential for failure of electrical connections, for example, becomes greater with each successive movement.

Further, the cost of such systems is out of the reach of many businesses and such a system may be overly complex for small business applications.

SUMMARY OF THE INVENTION

In accordance with the present invention, a flexible tooling system is provided wherein a support table has a plurality of apertures therein wherein said apertures are adapted for receiving a self-contained actuator therewithin in removable relation. Each position of the support table provides a vacuum and air supply line as well as a bus or network interface so that each position may be addressed separately. The removable actuator has corresponding connectors for receiving the vacuum and air supply as well as for interfacing with the bus, each position having a unique address so that an actuator may be placed at a particular location by insertion into the receptacle at the table aperture and subsequent securing thereto. The actuator may then be addressed on the bus to command the actuator to raise, lower, lock in position and supply vacuum.

It is accordingly an object of the present invention to provide an improved flexible tooling support system.

It is a further object of the present invention to provide an improved flexible tooling support system which allows easy removal and repositioning of support actuators.

It is a further object of the present invention to provide an improved flexible tooling system wherein individual actuators are passively moved to an appropriate position and then locked into place.

It is yet another object of the present invention to provide an improved flexible tooling system wherein individual actuators are actively operable to position themselves to a precision position.

It is a further object of the present invention to provide an improved flexible tooling system with active positioning with a non-servo technology.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 5 is a cross-sectional view of a typical passive actuator;

FIG. 6 is a more detailed cross-sectional view of a portion of the actuator of FIG. 5 illustrating the locking mechanism for securing an individual actuator in position once the desired position has been obtained;

DETAILED DESCRIPTION

Figure 1:
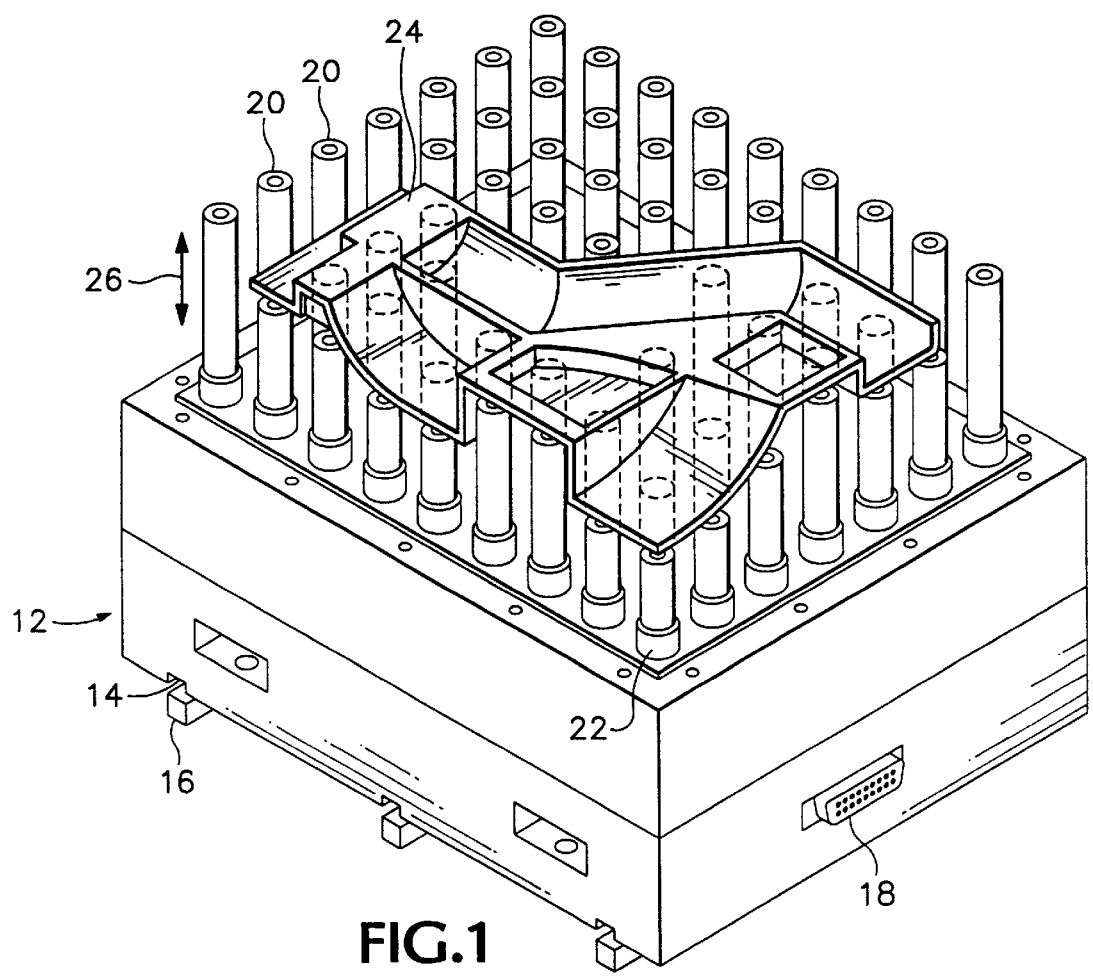
FIG. 1 is a perspective view showing a flexible tooling system with a representative part positioned thereon.

Referring now to FIG. 1, a perspective view of a section of a support system according to the present invention with a part supported thereon, the flexible tooling system comprises a table portion 12 which is modular in construction so as to enable plural table portions 12 to be placed adjacent one another to provide variable size support surfaces. The table portion 12 is substantially rectangular and includes three positioning slots 14 at the bottom thereof which extend substantially from one edge of the table portion to an opposing edge. The slots mate with corresponding guide members 16 which are located as appropriate at a work site to enable the table portion 12 to be precisely positioned by placement on top of guide members 16. Table portion 12 also includes an electrical interface 18 which supplies electrical power as well as addressing information to each of plural positions for actuator placement. The actuators 20 are arranged in spaced relation as mounted in actuator holes 22 in table portion 12. The actuator holes may be spaced in alternating offset rows or may also be provided in regular rows, as illustrated in FIG. 1, and provide mounting points wherein an actuator 20 may be inserted into a mounting hole 22 and secured to the table by any suitable means, for example, bolting. The part 24 being machined or otherwise worked sits atop actuators 20 which provide a variable height surface for supporting the part. Each actuator may be extended or retracted vertically along axis 26 to provide variable height surfaces. The cooperation between multiple actuators and their varied adjustment heights provides a support surface that conforms to the contour of the part. Note that it is not necessary that the part be supported by the actuators over a continuous surface, but that providing various support points is sufficient.

While the table 12 as illustrated in FIG. 1 carries actuators in each of actuator holes 22, the system is such that actuators need not be present in each of the holes 22. Accordingly, table 12 need not be fully populated with actuators, providing reduced cost and flexibility.

Figure 2:
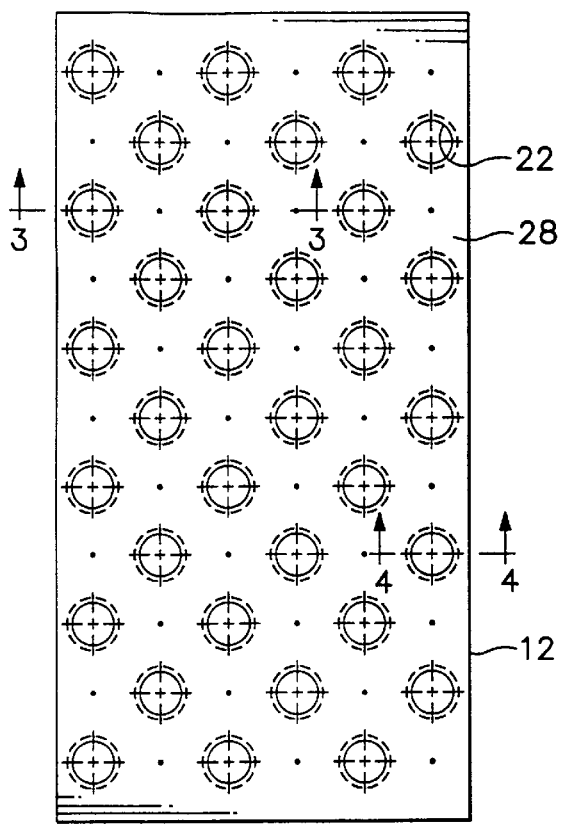
FIG. 2 is a top view of a support table section.

Referring to FIG. 2, which is a top view of support table 12 with no actuators placed therein, the alternating row patterns of the support holes 22 may be observed. More than one support table 12 may be placed adjacent each other in end-to-end or side-by-side relation to provide a variable sized tooling bed.

Figure 3:
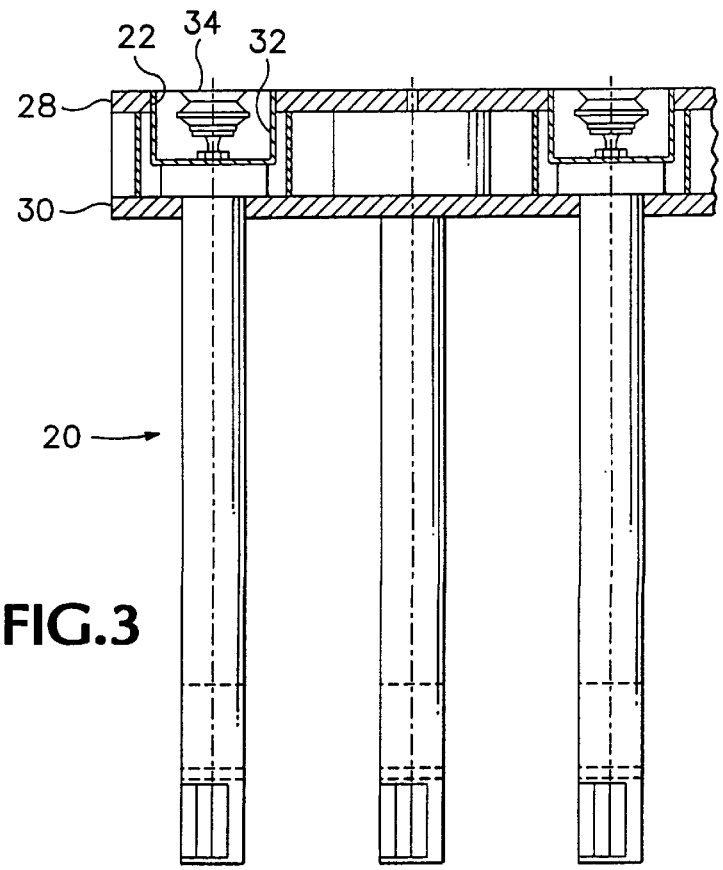
FIG. 3 is a sectional view of the table of FIG. 2 taken along line 3—3 of FIG. 2 illustrating placement of actuators in relation to the table when in retracted position.

Referring now to FIG. 3, which is a cross-sectional view taken along line 3—3 of FIG. 2, illustrating a support table with two actuators therein, it may be observed that the table comprises an upper table portion 28 which has apertures 22 defined therein as well as a lower table portion 30 which is in spaced relation below upper table portion 28. A liner 32 defines a space between upper table portion 28 and lower table portion 30 and substantially seals the inner volume between the two table portions against entry of contaminants and the like. The liner may typically be a polyurethane cup. An actuator 20 is secured to lower table portion 30 and extends therebelow with the substantial portion of the actuator components being below lower table portion 30 as discussed hereinbelow. The portion of the actuator that extends above table portion 30 further extends into a well defined by liner 32 and may include an end-effector 34 mounted thereto, which may be, for example, as described in co-pending U.S. patent application Ser. No. 08/077,552 entitled END EFFECTOR, now U.S. Pat. No. 5,427,363. When the actuator is in a retracted position, the well has sufficient depth such that the end-effector 34 does not extend above the plane of table top portion 28.

Figure 4:
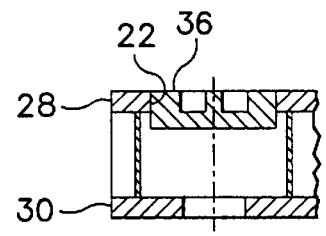
FIG. 4 is a sectional view of the table of FIG. 2 taken along line 4—4 illustrating the placement of a plug in the table aperture where an actuator is not presently positioned.

For table apertures 22 which do not currently have an actuator installed thereon, a plug member 36, illustrated in FIG. 4 in cross section, is inserted into aperture 22 to seal the interior portions of the table against entry of contaminants as well as to prevent contaminants from passing through the bottom portion 30 of the table into the space therebelow.

Referring now to FIG. 5, a cross-sectional view of a typical passive actuator, the actuator 20 comprises a main housing portion 42 which includes an upper flange area 44 for engaging with lower table portion 30 (FIG. 3). The main housing 42 is long in relation to its diameter, for example in a particular embodiment the main housing is approximately 24 inches long, while approximately 2½ inches diameter. The housing is substantially hollow and receives a cylinder rod 46 in close fitting but sliding engagement with the interior of the housing. The cylinder rod is substantially surrounded near the upper portion of the main housing by a locking member 48, which is described in greater detail with reference to FIG. 6 hereinbelow. At the lower extent of cylinder rod 46, an air cylinder piston 50 is provided as described in greater detail with reference to FIG. 7 hereinbelow. Attached to the lower end of housing 42 is hydraulic intensifier 52, again, described in greater detail with reference to FIG. 7 hereinbelow. Mounted below the hydraulic intensifier are actuator valves 36, 38 and 40 which are operative to control the extension, retraction, locking and vacuum/positive air pressure application of the individual actuator internally. A hydraulic supply line 54, shown in phantom, extends from intensifier 52 up to locking member 48 via an internal portion of the body of the intensifier and the main housing, enabling a system with no external plumbing and hence no hoses or fittings to leak.

In operation, the intensifier 52 is supplied air pressure and employs a relatively low pressure pneumatic input to intensify and create a much higher pressure hydraulic supply for governing operation of the clamping member 48.

Figure 9:
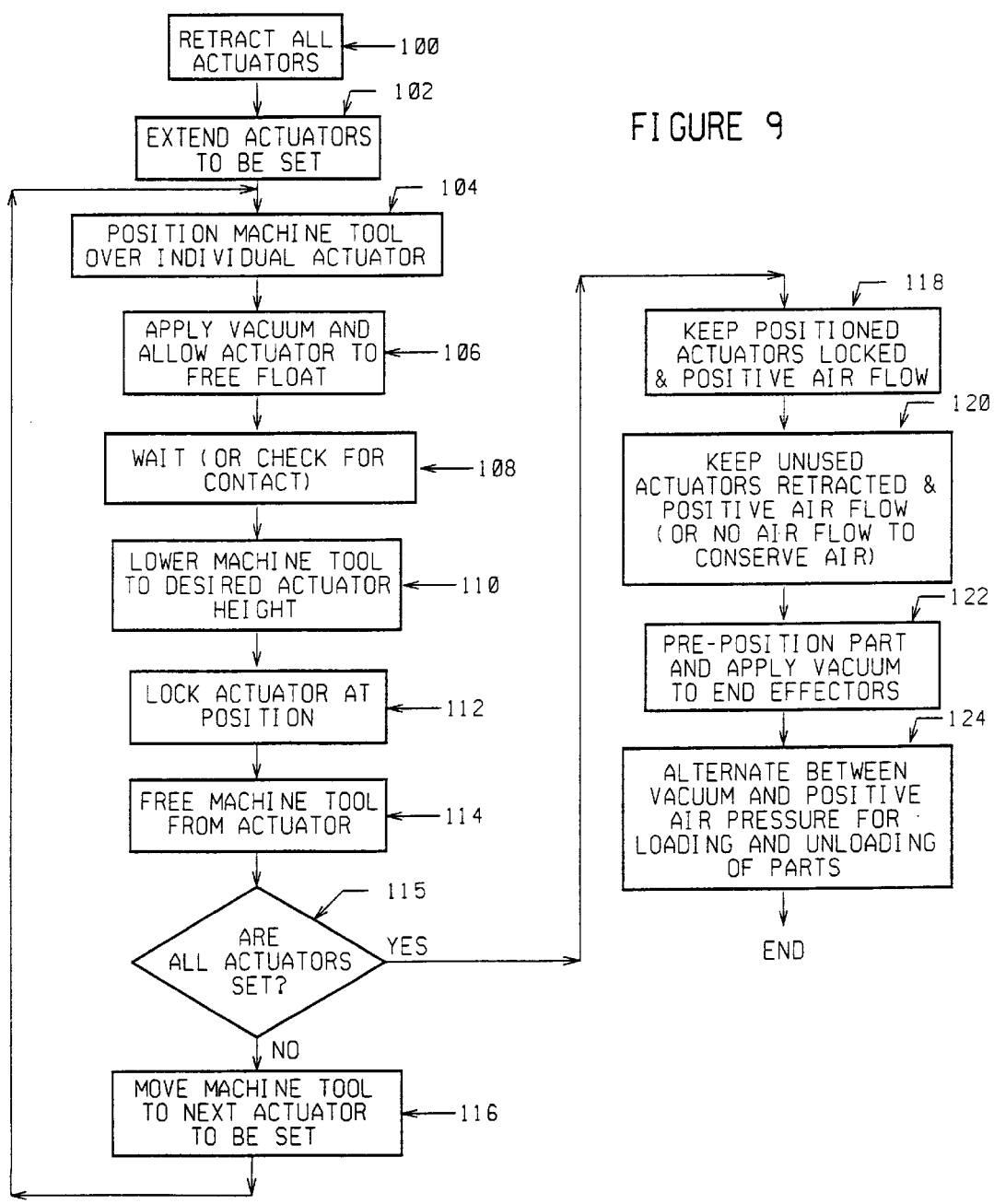
FIG. 9 is a flow chart of operational steps employing the flexible tooling system.

The actuator is deemed passive because it relies on outside means to accurately set the height of the actuator, for example, a machine tool as discussed in conjunction with FIG. 9 hereinbelow.

With reference to FIG. 6, which is a more detailed cross-sectional view of the upper portion of the actuator housing and components therewithin, it may be observed that a locking sleeve 56 substantially surrounds cylinder rod 46. The locking sleeve may be securely engaged to the main housing by threading 58, for example, which is suitably provided in a recessed portion of the main housing. In a preferred embodiment, the locking sleeve is held in place with a retaining ring 69 (illustrated in phantom in FIG. 7), to assure that the sleeve does not come loose. The locking sleeve is substantially annular in shape and includes a thin annular clamping portion 60 which is adjacent cylinder rod 46 at least along an extent thereof. In the area where portion 60 is adjacent cylinder rod 46, a space 62 is defined wherein the space 62 receives hydraulic fluid therewithin. Accordingly, when pressure is applied to the hydraulic fluid 64, the locking sleeve portion 60 is caused to deform inwardly so as to firmly engage the rod 46, thereby preventing longitudinal movement of the cylinder rod. A spacer 66 is provided to substantially fill the majority of the volume of the aperture 62 so as to enable a minimal amount of hydraulic fluid to be necessary for causing deformation of portion 60. A purpose of spacer 66 is to compensate for the compressibility of the hydraulic fluid 64, since the volume of fluid is substantially reduced by the presence of the spacer. Upper and lower O-rings 68 and 70 provide seal between locking sleeve member 56 and the main housing, while O-ring 72 provides a seal for the retraction air pressure. It will be understood that cylinder rod 46 is substantially hollow within the interior. In an alternative embodiment, clamping portion 60 is in tight (interference fit) engagement with cylinder rod 46 in the absence of hydraulic pressure, and is caused to unclamp when hydraulic pressure is applied, thereby assuring that an actuator does not become unlocked on loss of hydraulic pressure. Further, an individual actuator (or the entire bed of actuators) can be disconnected from the various utilities (air, electric, control) and maintain the desired extension position. Such a configuration enables, for example, the system to be set up in a given place, and transported and used at another location.

Figure 7:
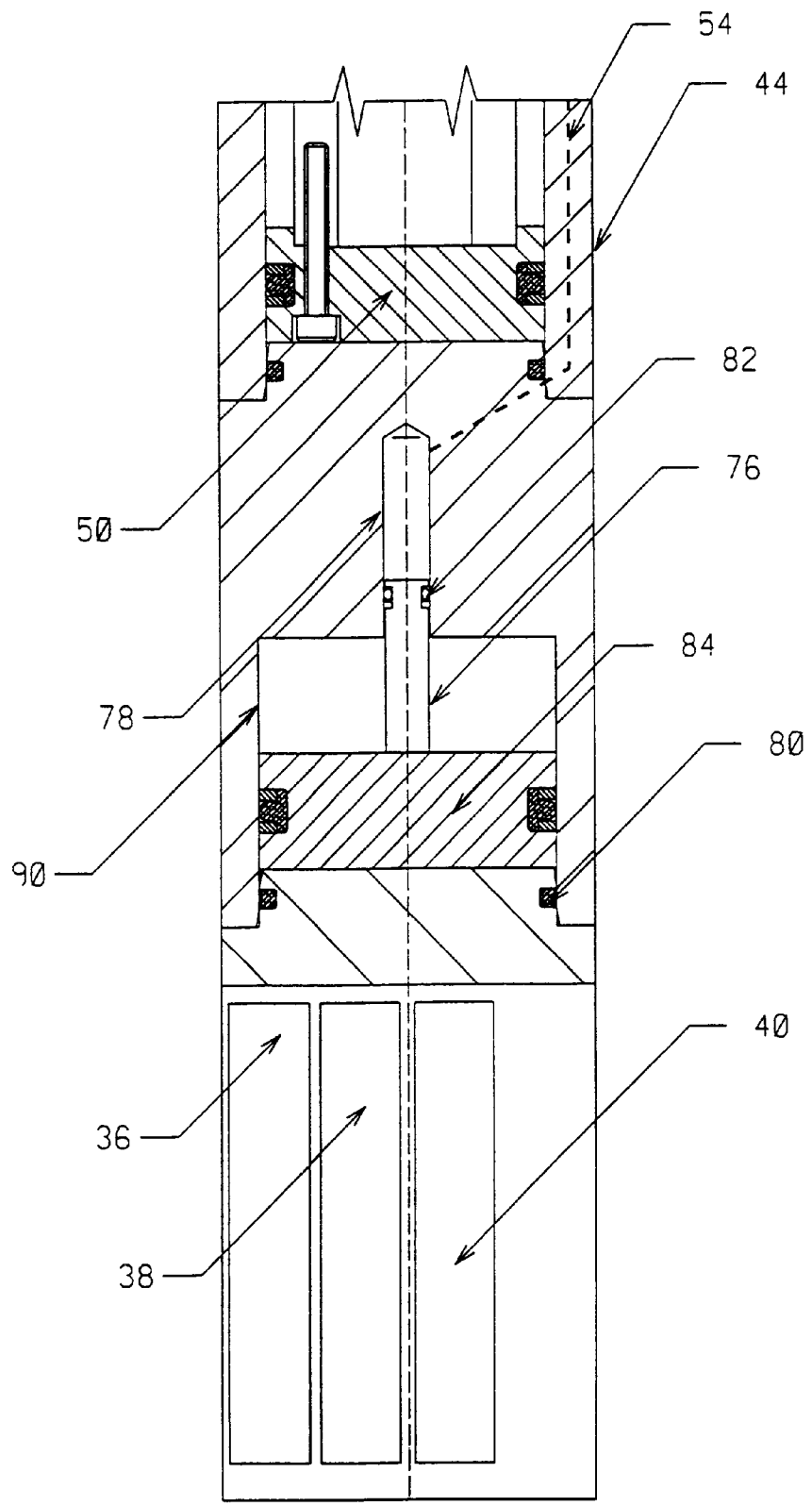
FIG. 7 is a more detailed cross-sectional of view the lower portion of the actuator of FIG. 5 illustrating a hydraulic intensifier used in conjunction with the locking mechanism of FIG. 6.

Referring now to FIG. 7, a more detailed cross-sectional view of the lower portion of actuator 20 illustrating the hydraulic intensifier used in conjunction with locking mechanism 48, as well as the placement of the operation valve, the intensifier body 52 mounts adjacent the lower portion of actuator housing 44. The intensifier comprises a piston rod 76 which is received by piston bore 78 centrally of the intensifier body. The piston 76 is relatively small in diameter compared to the overall diameter of the intensifier body. Intensifier piston 76 is slidably movable within cavity 78 and moves inwardly and outwardly in the cavity with movement of intensifier piston 84. Intensifier piston 84 is substantially larger than intensifier piston 76 and is slidably movable with piston bore 90, which is of fairly large diameter relative to the diameter of intensifier body 52. Both pistons 76 and 84 have respective piston seals 82 which enable movement of the piston within the piston bore while preventing loss of pressure around the outer edge of the piston. Piston 76 is mounted to and moves in conjunction with movement of piston 84 and is operative such that movement of the large piston 84 results in movement of the smaller piston 76. Since piston 76 fits within a much smaller bore 78, the relatively low pressure movement of piston 84 is intensified to a relatively high pressure within piston bore 78. Piston bore 78 is suitably filled with a hydraulic fluid and is in fluid communication with the chamber 62 surrounding the clamping portion 60 of clamping member 48.

Air pressure is supplied to operate piston 84 upwardly and downwardly via an air channel in the end cap 80, not shown. A check valve and orifice on the interior end of the end-effector provide a slow leak under pressure and high flow under vacuum, to enable pressure and vacuum to be supplied to any end effector mounted to the cylinder rod.

Extension and retraction of cylinder rod 46 is accomplished by powering piston 50. When air is supplied to the extend side of the piston, rod 46 extends and when air is supplied to the retract side of the piston, rod 46 retracts.

Figure 8:
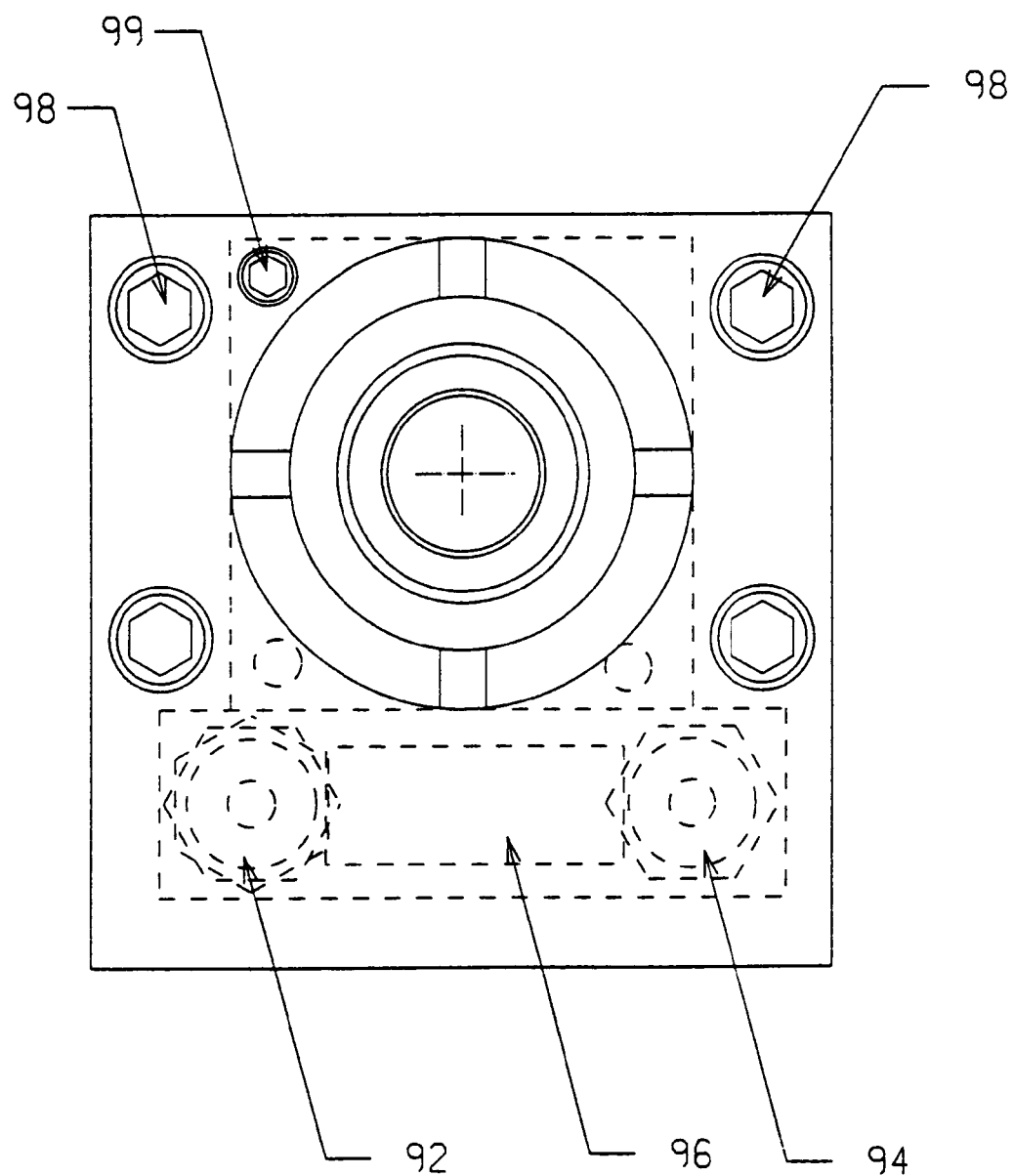
FIG. 8 is a top view of the actuator of FIG. 5, illustrating the various connections to an individual actuator.

Referring now to FIG. 8, a top view of an actuator as illustrated in FIG. 5, showing the attachment and various connections to the support table, pressure and vacuum connectors 92 and 94 are positioned in a portion of the flange of main housing 44 and electrical/bus interconnector 96 is positioned between the two connectors 92 and 94. Corresponding connectors are provided at each position of the support table so that when an individual actuator is inserted into an opening of the support table, the vacuum, pressure and electrical connectors mate with the corresponding connectors at the support table, thereby providing vacuum, air pressure and electrical supply and commands to the actuator. The air pressure and vacuum connectors at the support table are self sealing such that when no actuator is present, the air pressure and the vacuum supply are sealed at that connector to prevent loss of vacuum or air pressure. The actuator is suitably secured to its position at the support table via four mounting bolts 98 which are spaced in any suitable pattern to provide appropriate engagement with the support table. A hydraulic bleed port 99 is also provided to allow the hydraulic portion of the individual clamping member in a particular actuator to be bled to remove air from hydraulic system.

The operation of the system described hereinabove in a typical application would entail positioning actuators in the various apertures of the table portion configuration appropriate to support the part to be worked upon and then adjusting the height of individual actuators to provide an appropriately shaped support base. FIG. 9 is a flow chart illustrating operational steps for the system. Returning to FIG. 9, the sequence of operation for using the system is as follows: First, all actuators present in the system are retracted to their lowermost position (step 100). Then, those actuators which are to be used in the current setting are extended to the end of travel, suitably in a simultaneous manner (step 102). In a particular embodiment the extension distance of the surface of the table is eight inches, although this is not a requirement. A machine tool which is being used in conjunction with the flexible tooling actuators is then directed to position itself above the first actuator (step 104). The machine tool will typically have a flat plate-like attachment thereon and this flat plate-like attachment is lowered to be in contact with the vacuum cup of the end-effector of the first actuator. Vacuum is then applied to the end-effector by operation of valve 40 of FIG. 7 and simultaneously the extend operation is turned off (by actuation of valve 36) to allow the shaft of the actuator to free float (step 106). The operation of the vacuum then causes the actuator to be sucked up into contact with the flat portion of the machine tool. Next, an appropriate wait period is allowed to pass (step 108), for example, two seconds, for the appropriate seal to be made between the vacuum cup and the machine tool member. Alternatively, sensing may be provided to determine that contact between the machine tool member and the end-effector has been appropriately made. This sensing may include proximity detection or some other type of contact switch, for example.

Now, with the end-effector (and thereby the actuator) in firm engagement with the machine tool member, the machine tool is lowered to bring the actuator to the desired height setting (step 110). The locking collet member 48 of FIG. 6 is activated by operation of valve 38 of FIG. 7, whereupon the shaft of the actuator is firmly locked into position (step 112). A time delay may be observed to assure complete locking, for example one second. Next, the vacuum being supplied is removed, which causes air to blow back through the end-effector, providing release of the machine tool plate member and the end-effector (step 114). In the particular embodiment, this operation is performed by activation of a retract command (actuation of valve 40) which does not cause the actuator to retract because the locking member 48 of FIG. 6 is engaged, but instead causes vacuum to be removed. The machine tool then retracts away from the actuator and proceeds to the next actuator in the sequence of actuators to be set (decision block 115, step 116). Once arriving at the next actuator, the setting process is repeated. This process continues multiple times until all actuators are set.

Once all the actuators have been set to their desired height, each securement member for the actuators in use is locked and various actuators are blowing a small volume of air through their end-effectors (block 118). Those actuators which are not being used in the present configuration are all set to the retract state and are also providing a small volume of air through the end-effector (block 120). The part to be operated upon is then prepositioned above the support table and adjusted to be engaged by the support members in the appropriate positions. Once so positioned, the retract valve is turned off (valve 40, FIG. 7) which causes vacuum to be applied to the actuators which are in the extended position (step 122). Accordingly, the part being operated upon is held by the suction force as a result of the vacuum and the cup portion of end-effectors 34. Loading and unloading of subsequent parts to be operated upon is accomplished by alternating the retract state between ON and OFF (block 124) which alternates between vacuum being applied through the suction cup of end-effector 34 and air being blown outwardly through the suction cup, accordingly holding or releasing the part being operated upon.

An individual actuator as illustrated in FIG. 7 employs three valves 36, 38 and 40 which suitably comprise spring return single solenoid 3-way valves. Valve 36, denoted the extend valve, when in its ON state causes the actuator shaft to extend and when in its OFF state causes air to be dumped from the extend operation. Valve 38 controls operation of the clamping member of FIG. 6 and when in an ON state causes the clamping to occur and when in an OFF state removes clamping to allow the actuator to extend or retract freely. Valve 40 controls retraction (the retract valve). When in the on state, valve 40 causes the actuator to retract and also allows air to bleed through the end-effector, while in the OFF state causes vacuum to be applied to the back of the actuator and pulls vacuum through the end-effector. In a particular embodiment, each valve is a 24 volt DC solenoid. The state of the various valves during the operation described hereinabove with reference to FIG. 9 is illustrated in Table 1.

TABLE 1

| Step | Valve 36 | Valve 38 | Valve 40 |
|------|----------|----------|----------|
| 100 | OFF | OFF | ON |
| 102 | ON | OFF | OFF |
| 104 | ON | OFF | OFF |
| 106 | OFF | OFF | OFF |
| 108 | OFF | OFF | OFF |
| 110 | OFF | OFF | OFF |
| 112 | OFF | ON | OFF |
| 114 | OFF | ON | ON |
| 116 | OFF | ON | ON |
| 118 | OFF | ON | ON |
| 120 | OFF | OFF | ON |
| 122 | OFF | ON | OFF |
| 124 | OFF | ON | ON/OFF |

Figure 10:
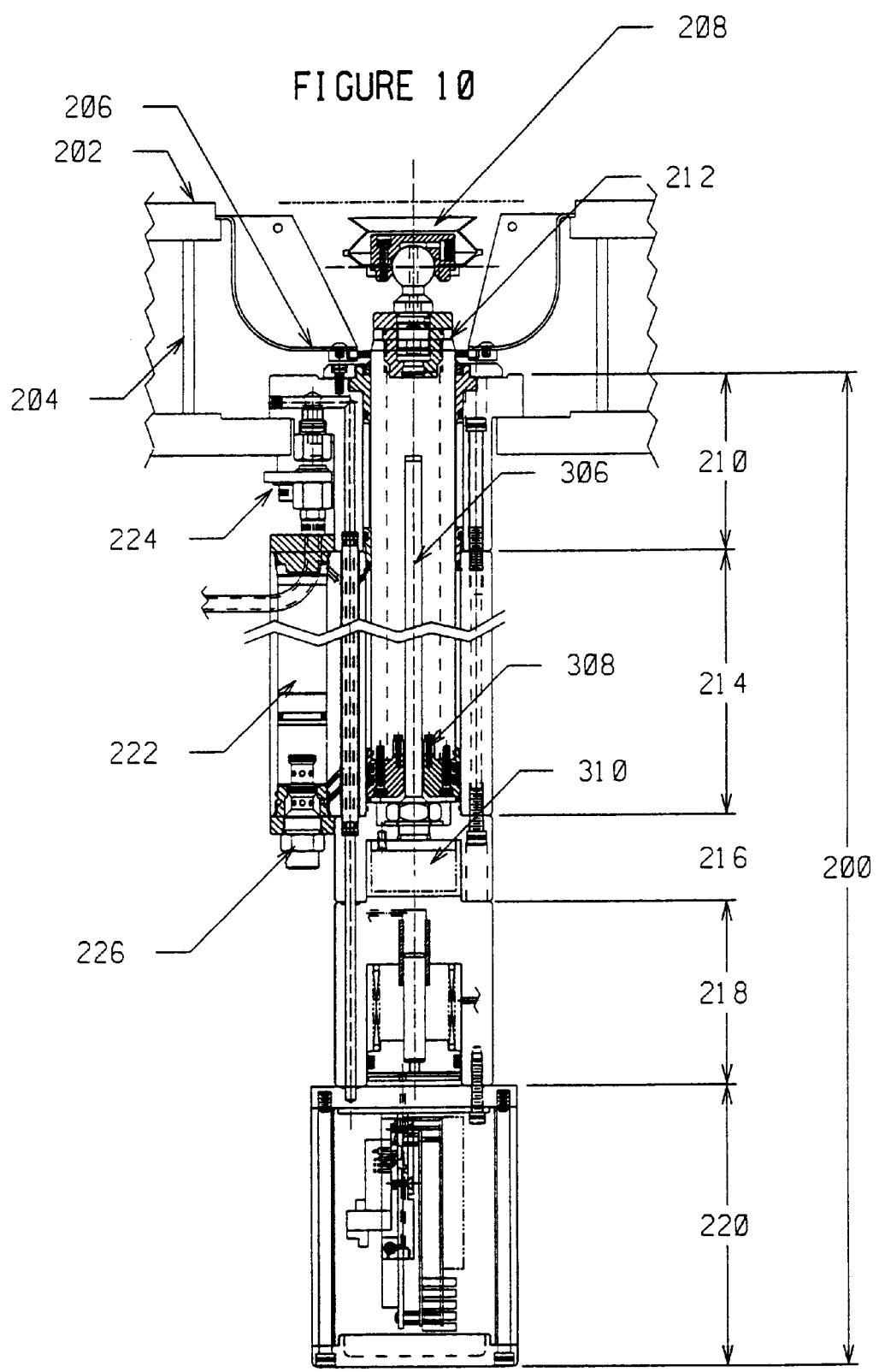
FIG. 10 is a partial cross-sectional view of an actuator according to an embodiment of the present invention employing active positioning.

Referring now to FIG. 10, a side partially cutaway view of an active actuator system according to the present invention, the features and operation thereof will be described. Operation and structure of some components of the active actuator system correspond to similar components of the passive actuator system. The active actuator system 200 is employed in conjunction with a table 202 which corresponds to the table 12 of the passive actuator embodiment described hereinbefore and includes an actuator well 204 which receives the actuator therein and may include a seal 206 to keep contaminants from entering below the table and contaminating components of the actuator. An end effector 208 is positioned at the end of the actuator body and in the illustration of FIG. 10 employs a swivel head vacuum clamp member. The active system comprises a number of main components, including clamp body 210 which is operative to clamp and unclamp the stroke rod 212, for holding the stroke rod in a desired position as well as for halting upward or downward movement of the stroke rod at a precise position. An actuator cylinder body member 214 supports the stroke rod 212 as well as the various plumbing and electrical members as discussed herein. A top view is provided of the cylinder body member 214, which is suitably formed as an extrusion and then cut to the desired length (determined by the stroke length of the actuator), in FIG. 11 and is discussed hereinbelow. A linear transducer 216 is provided within the actuator system to accurately describe the current extended position of the stroke rod, while mounted therebelow is an intensifier 218 which operates in a corresponding manner to the intensifier described hereinbefore with reference to FIG. 7. The intensifier thus employs a relatively low pressure pneumatic supply to intensify a relatively small volume of hydraulic fluid, e.g. oil, to provide a high pressure clamping force for the clamp body 210. Mounted below the intensifier is valve and controller body 220 which includes solenoid valves for switching the flow of pneumatic and hydraulic supply for directing the up-and-down and clamp-and-unclamp operations of the system. A controller is also provided which receives commands from a central control over a network (see FIG. 16) to position the stroke rod to the desired height for operation and governs operation of the solenoids to accurately position the actuator. The system also includes an oil reservoir 222 which stores the hydraulic fluid and which also, as governed by speed valve 226, enables a flow rate to be modified to change the speed at which the stroke rod 212 extends or retracts.

Figure 17:
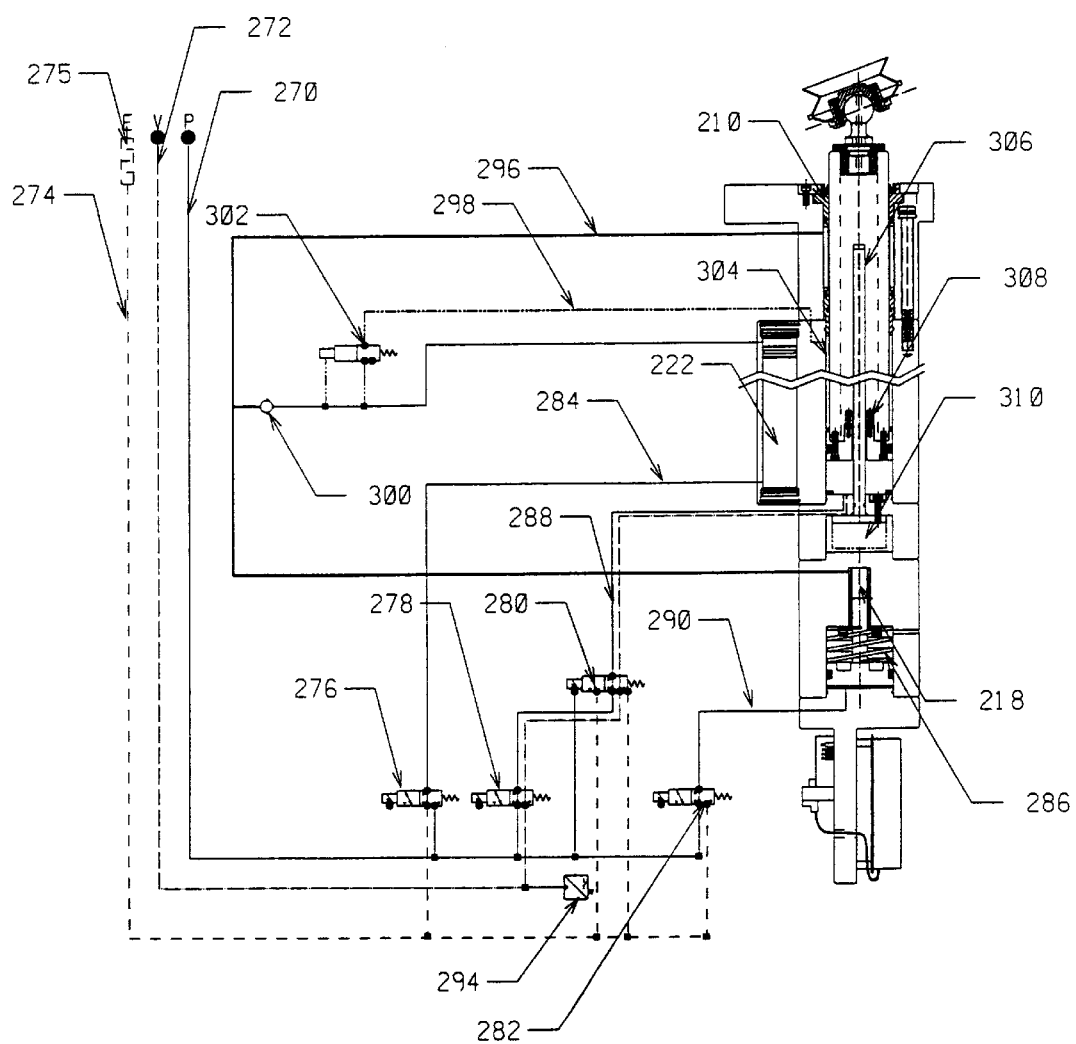
FIG. 17 is a diagram illustrating the pneumatic/hydraulic circuits which enable extension/retraction and other operations by the actuator as well as clamping of the clamp body member.

Referring now to FIG. 17, a pneumatic/hydraulic diagram illustrating the various circuits thereof which enable extension and retraction of the actuator, the operation thereof will now be described. Referring to FIG. 17, the system comprises a pneumatic supply line 270 which supplies air under pressure, a vacuum supply line 272 which supplies vacuum and an exhaust line 274 which exhausts air pressure as appropriate during operation. A muffler 275 may also be included on the exhaust line to muffle exhaust noise. The vacuum and air pressure lines 272, 270 are suitably provided as noted hereinabove to an operational table wherein an individual actuator connects via a coupling to each of the vacuum and pressure supplies. The pressure supply line 270 is further connected to various solenoids, including the retract and speed control solenoid 276, the vacuum/pressure solenoid 278, the extend solenoid 280 and the intensifier solenoid 282. From the other side of solenoid 276, air pressure is supplied to oil reservoir/accumulator 222 via accumulator pressure line 284. Air pressure from vacuum/pressure solenoid 278 is further provided to the extend solenoid 280 and air pressure as output by solenoid 280 is provided by rod extension line/actuator vacuum line 288 to the actuator for governing extension thereof. Intensifier solenoid 282 supplies air pressure to the extend side of the extend side of the intensifier circuit via intensifier extend line 290. A return spring 286 causes the intensifier to retract in the absence of extension pressure. Vacuum is distributed by solenoid 278, as further supplied through solenoid 280 and supplied as rod extension line/actuator vacuum line 288 to the actuator system. Vacuum is also supplied to vacuum pressure transmitter 294 which detects an existence of vacuum, for control system logic and the like.

Each actuator unit, which as noted hereinbefore is adapted for insertion and removal at individual sites on a table and essentially self-contained, includes its own self-contained hydraulic system which suitably employs oil as a hydraulic fluid. The hydraulic system includes both a high pressure hydraulic system 296 illustrated in bold lines in FIG. 17 and a low pressure hydraulic system illustrated in semi-bold lines 298. Pressure for the high pressure hydraulic system is generated by the intensifier circuit 218 wherein the high pressure is supplied to the clamp body 210 for controlling clamping as discussed hereinbelow. The low pressure oil system is supplied by oil reservoir 222, pressure being generated by air pressure line 284, and is further connected to a fill check valve 300, with the high pressure oil system also connected to the check valve. Accordingly, since the high pressure system operates on a very small oil volume, while the low pressure system employs a much greater oil volume, the accumulator/oil reservoir 222 is suitably able to resupply oil to the high pressure system via the check valve. Since the high pressure system is not always at high pressure, but only during certain clamp operations as discussed hereinbelow, when the high pressure side is at a low pressure, oil from the accumulator is allowed to resupply the high pressure side via the check valve. However, the check valve prevents the high pressure circuit oil from traveling backwards to the low pressure side. Thus, the individual actuator is somewhat self-contained and only need be resupplied with oil (via replenishing of the oil reservoir 222) on rare occasions or during routine, infrequent maintenance. The low pressure side includes a speed control valve 302, corresponding to valve 226 of FIG. 10, which further connects the low pressure system to a dampening system 304 which is operative to provide extend/retract dampening. In operation, the speed control valve 302, as directed by the valve controller circuitry 220, is either in a high or low flow speed mode. In the high flow speed mode, the oil is able to relatively freely flow between the accumulator and the dampening volume space 304. However, in the low speed position, since the valve is ground to provide a precise known leak rate, the transfer of oil between the accumulator and the dampening space is at a slower rate. Accordingly, the actuator extends at a much slower rate. Any contamination which may collect in speed valve 302 during its slow or closed state is suitably swept away when the valve opens to its high speed state, effectively flushing the valve and preventing its becoming clogged by buildup of contaminants.

As also mentioned herein with reference to FIG. 10, the active actuator system includes a linear transducer 306 therein which, in conjunction with annular magnet 308 and circuit board 310, generates a position signal provided to the controller. The magnet 308 extends and retracts along the length of transducer 306, generating a signal which is interpreted by circuit board 310 to indicate the position of the magnet. Since the magnet is secured to the actuator piston, it thus indicates the amount that the piston is extended. The transducer, magnet and accompanying circuit board are preferably manufactured by Balluff Incorporated of Germany.

In operation, the system causes extension and retraction of the actuator cylinder by appropriate operation of the solenoids and subsequent application of vacuum or air pressure. The extension is controlled somewhat by the dampening circuitry 304 wherein as the rod extends, the volume of area 304 is reduced and excess oil is displaced through speed control valve 302 into accumulator 222. The extension speed is governed precisely by whether the speed control valve is in its fully open position or in the closed/controlled leak position. In the preferred embodiment, retract is always at the fast flow rate. Thus, in operation, the actuator is extended a substantial distance at high speed and then, when within for example one-half inch of its final destination, valve 302 is operated to switch to slow speed, whereupon once the desired location is reached, then solenoid 282 is operated so as to cause the intensifier to retract, reducing the oil pressure in the high pressure oil line 296 which thus allows the clamping member to relax to its clamped position, securing the actuator rod at its desired position.

The clamping member comprises a hydraulic collet in interference fit with the extension rod (0.0015 inches). The collet is mildly heated to, for example, 300 degrees, to initially slip it onto the shaft. O-rings on the inside of the collet at both ends enable introduction of high pressure oil to the inside of the collet. A pair of O-rings on the outer diameter with a hole through to the inner diameter provide the path in for the oil. Applied pressure expands the collet, with the normal state of the collet locked. Alternatively, a normally unlocked collet may be used as previously described.

When movement of the rod is desired, then the intensifier is caused to extend, thereby raising the oil pressure in line 296 which causes the clamp member to expand outwardly thus enabling the actuator to move upwardly or downwardly, since the clamp member is in an interference fit with the rod during those times at which the intensifier is not supplying pressure to the high pressure oil line. Once the actuator rod is appropriately positioned, a determination may be made via a linear transducer whether the rod actually was positioned within a desired tolerance range. If desired, it is possible in accordance with the present invention to unclamp the rod and then reposition. Positioning accuracy is further enhanced by calibration on an occasional basis, to determine the time required for clamping to be effective. Thus, to calibrate the system, the actuator is caused to move (suitably at low speed, for increased accuracy) and the clamp command is given while simultaneously measuring the actuator's position as reported by the linear transducer. Then, the final position of the actuator is read from the transducer after the actuator stops moving and the difference between the position when the clamp command was given and the actual clamped position is determined and factored in for future clamping commands, so that the clamp command is given at the appropriate time.

Once clamped in position, then vacuum may be supplied by operation of solenoids 278 and 280 wherein a check valve is provided to the interior of the piston rod so as to provide vacuum up through the center thereof to the end effector as desired for securing via suction, any workpiece being secured against the end effector.

The intensifier operates in a manner corresponding to that as discussed hereinabove with reference to FIG. 7, in the passive embodiment.

Figure 11:
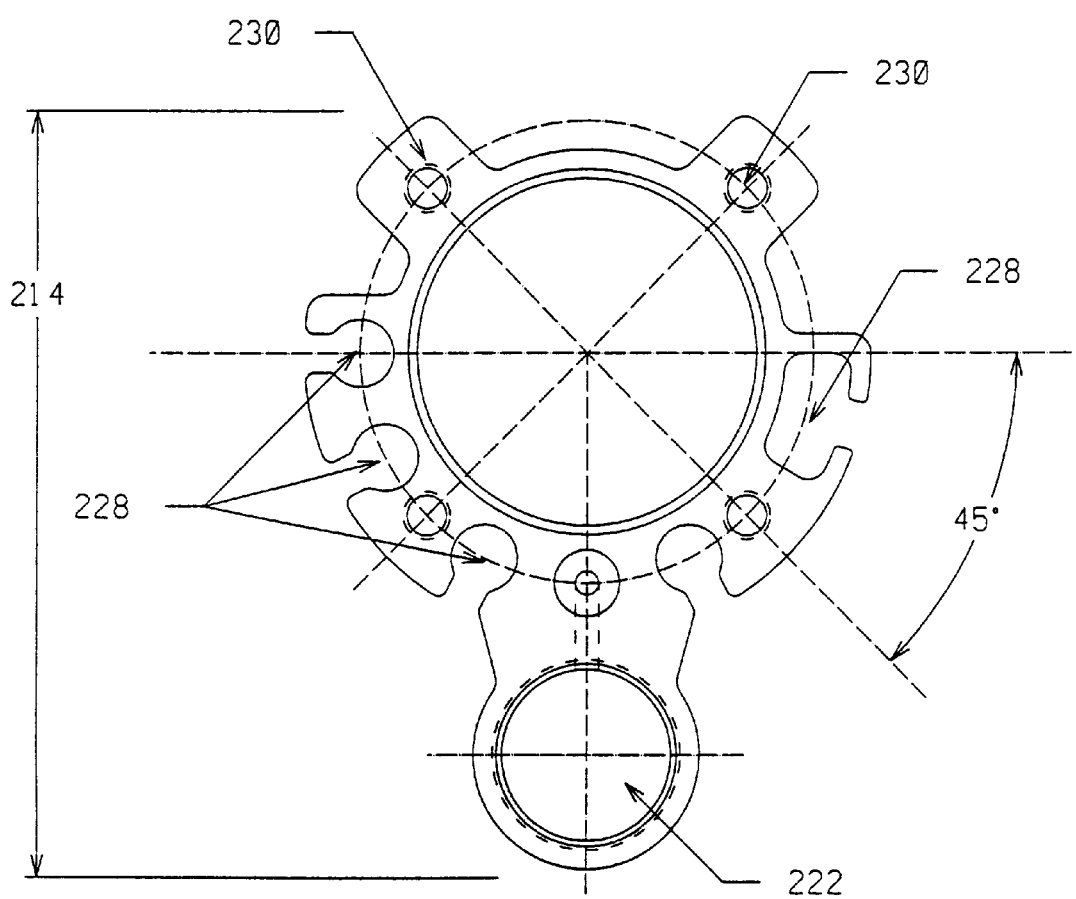
FIG. 11 is a top view of the cylinder body of the actuator of FIG. 10.

Referring now to FIG. 11, which is a top view of the cylinder body of the actuator of FIG. 10, it may be observed that in cross section the actuator body is somewhat annular in configuration with the addition of the oil reservoir 222. About the periphery of the cylinder body are a series of openings 228 which are provided to pass electrical cables and air/vacuum/oil tubes along the extent of the body. Four openings 230 are provided to receive fasteners for securing other pieces of the system thereto.

Figure 12:
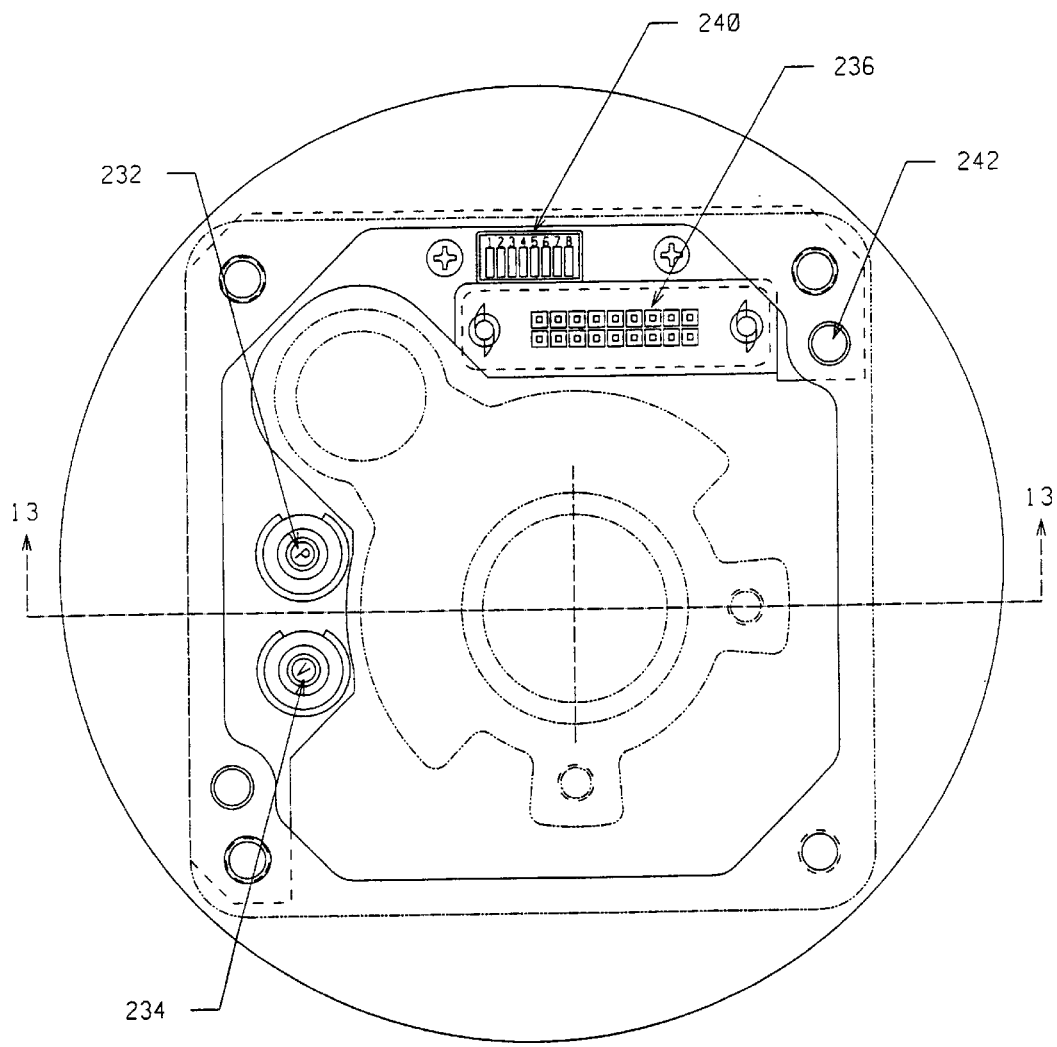
FIG. 12 is a top view illustrating the specific connections provided in the table for receiving the actuator.

Referring now to FIG. 12, which is a top view of the interface portion 224 of a table which receives and connects with an individual actuator, the air pressure is provided via a coupling 232 while vacuum is provided to coupling 234. Both couplings are connected to respective pneumatic and vacuum supplies which are suitably provided at each position on the table suitable for receiving an actuator therein. The couplings are normally closed when not connected to an actuator such that no air or vacuum leak occurs in table positions which do not have actuators placed therein. An electrical interface 236 is also provided and suitably provides ground, power, and twisted pair communication for RS-485 or other multi-drop network communication standard. Corresponding connectors are provided on the actuator which mate with couplings 232 and 234 and electrical connector 236 such that when the actuator is positioned and lowered into the table, couplings 232 and 234 and connector 236 interconnect with their corresponding parts on the actuator itself. Both connectors 234 and 232 as well as the electrical interface 236 are mounted in a "floating" fashion such that longitudinal and lateral movement is allowed (X-Y) to accommodate slight misalignment as the actuator is inserted into the table. This ensures that the actuator does not bind or become misaligned so as to damage the connector or not properly seat in the table. An addressing means 240 is also provided, which in the illustrated embodiment comprises an eight position DIP switch. The address of the individual table position is accordingly set by operation of the switches on the DIP switch. Accordingly, the RS-485 address of this particular table position may be uniquely set at installation time. Thus, an actuator may be moved from any position on the table to any other position on the table without the need for reprogramming of the actuator, since each individual table position has its own unique address. The RS-485 standard enables up to 256 addresses on an individual bus. Since a particular application of the present invention employs up to 1200 or more table positions, multiple hubs are employed, each hub having no more than 256 individual table positions addressed thereon.

Figure 13:
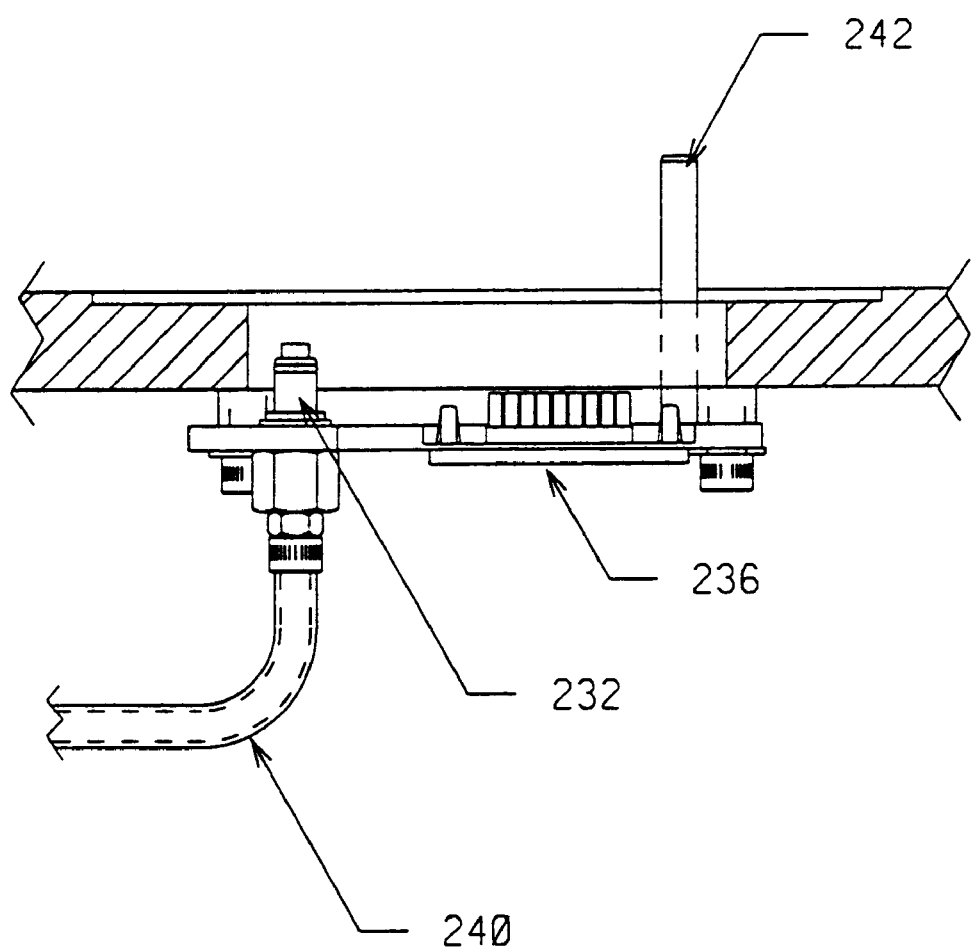
FIG. 13 is a side view illustrating features of the actuator receiving site of an actuator table according to the present invention.

Referring now to FIG. 13, which is a side view of the table insert position of FIG. 12, partially cut away taken along line 13—13 of FIG. 12, the position of air connector 232 may be observed as well as electrical connector 236. Pneumatic supply to connector 232 is provided via a pneumatic hose 240 which is supplied by an external pneumatic supply source. A dowel portion 242 is provided at the table position and extends upwardly a distance above the plane of the position and provides an alignment pin for engaging the actuator (which has a corresponding recess) as it is lowered onto the table position, assisting in guiding the actuator to the proper seating thereof.

Figure 16:
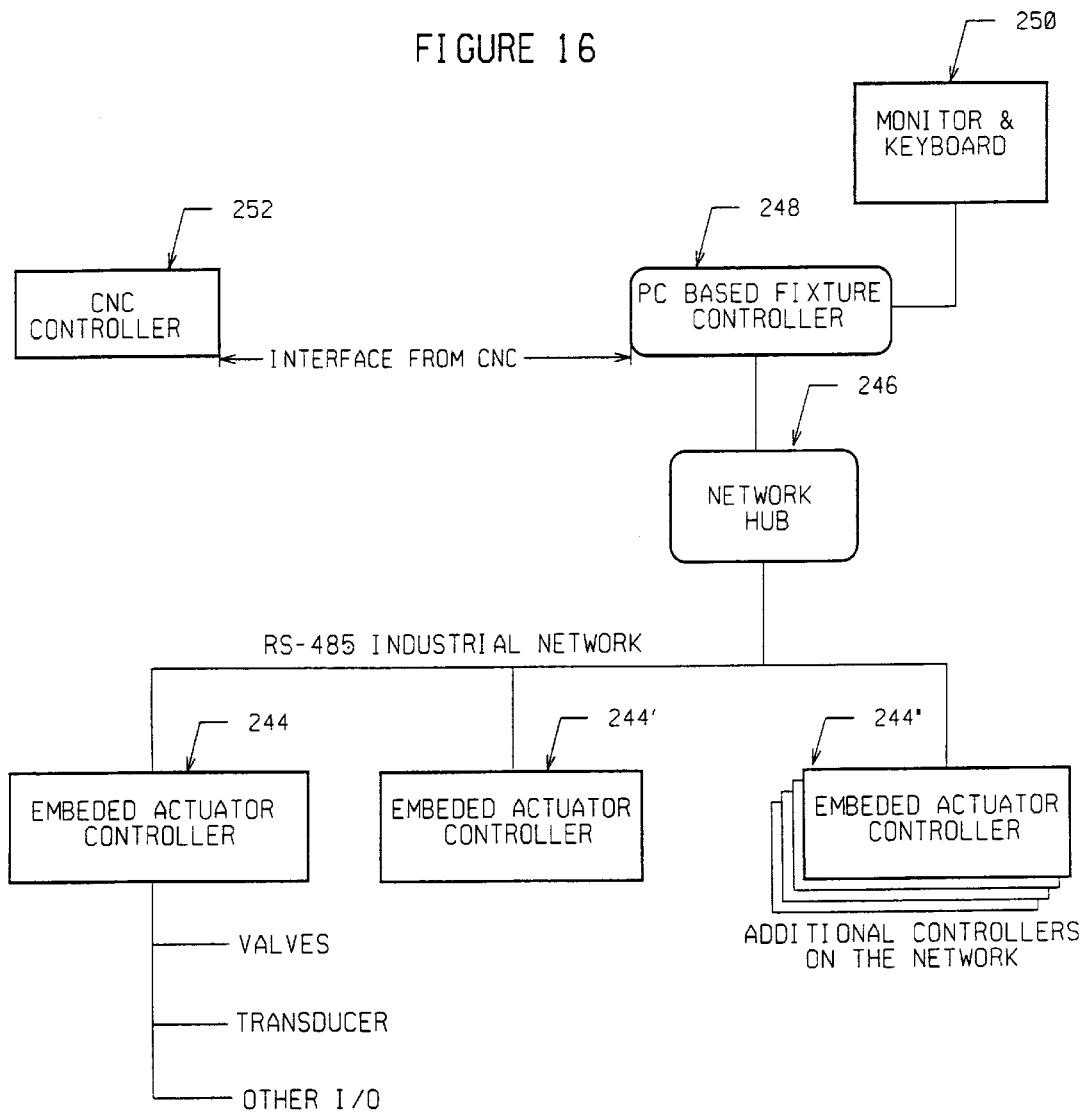
FIG. 16 is a block diagram of a typical system employing the active actuators of the present invention.

Referring now to FIG. 16, which is a block diagram of a particular architecture employed in controlling the operation of a system according to the present invention, each individual actuator has its own dedicated controller 244 with other controllers for other actuator positions designated 244', 244". Since a given system may employ many actuators, each with its own controller, hundreds of controllers may exist on the network, with up to 256 on each individual network hub. One network hub is illustrated (246) in the embodiment of FIG. 16. Referring again to an individual embedded actuator controller 244, connected thereto are the valves, transducer and the ability for any other I/O device as needed. As noted hereinbefore, each embedded actuator controller 244 is connected to a network hub 246, wherein plural network hubs 246 are interfaced with a personal computer based controller 248 which includes monitor and keyboard 250 for directing operation of the system. The PC controller 248 is further suitably interfaced with, for example, a CNC controller 252 which is operative to direct a machine tool or the like to perform operations on the workpiece being held by the flexible tooling system of the present invention. Since each RS-485 network allows a maximum of 256 separate addresses, the PC controller 248 is programmed to know that, for example, the multiple network hubs are configured as banks of up to 256 positions each, such that, for example, actuator position number 741 on a given table would be on network hub 3, for example. Accordingly, any command to that position of the table would be sent to network hub 3.

Figure 14:
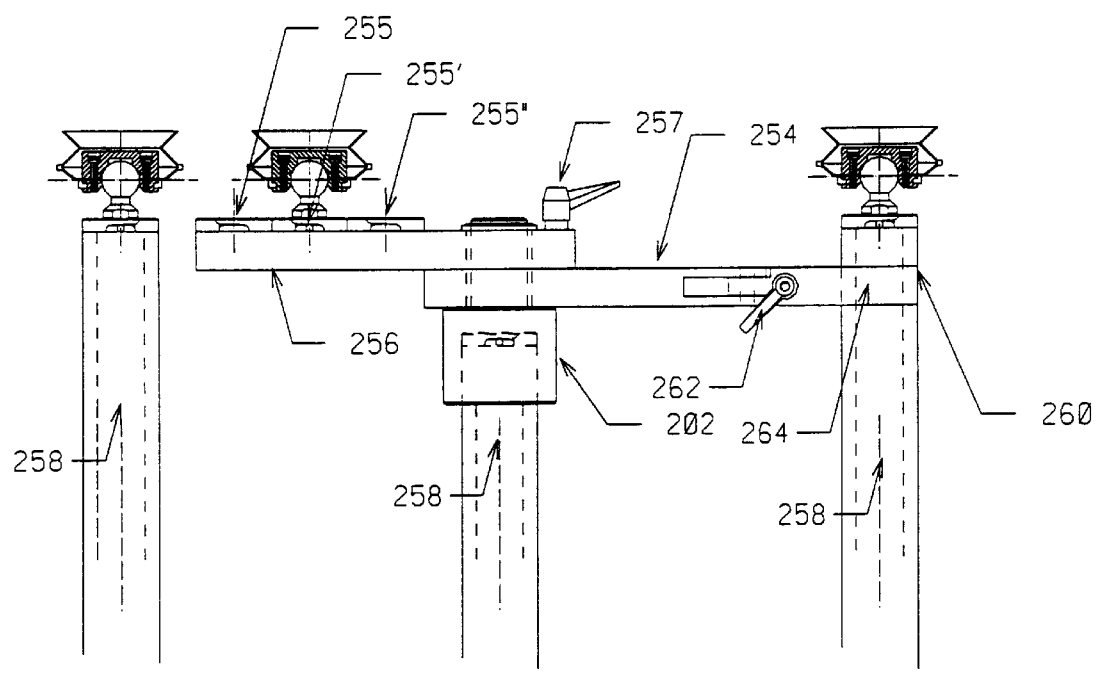
FIG. 14 is a side view of a portion of a table with actuators installed thereon, illustrating an extension mount employed with the present invention.
Figure 15:
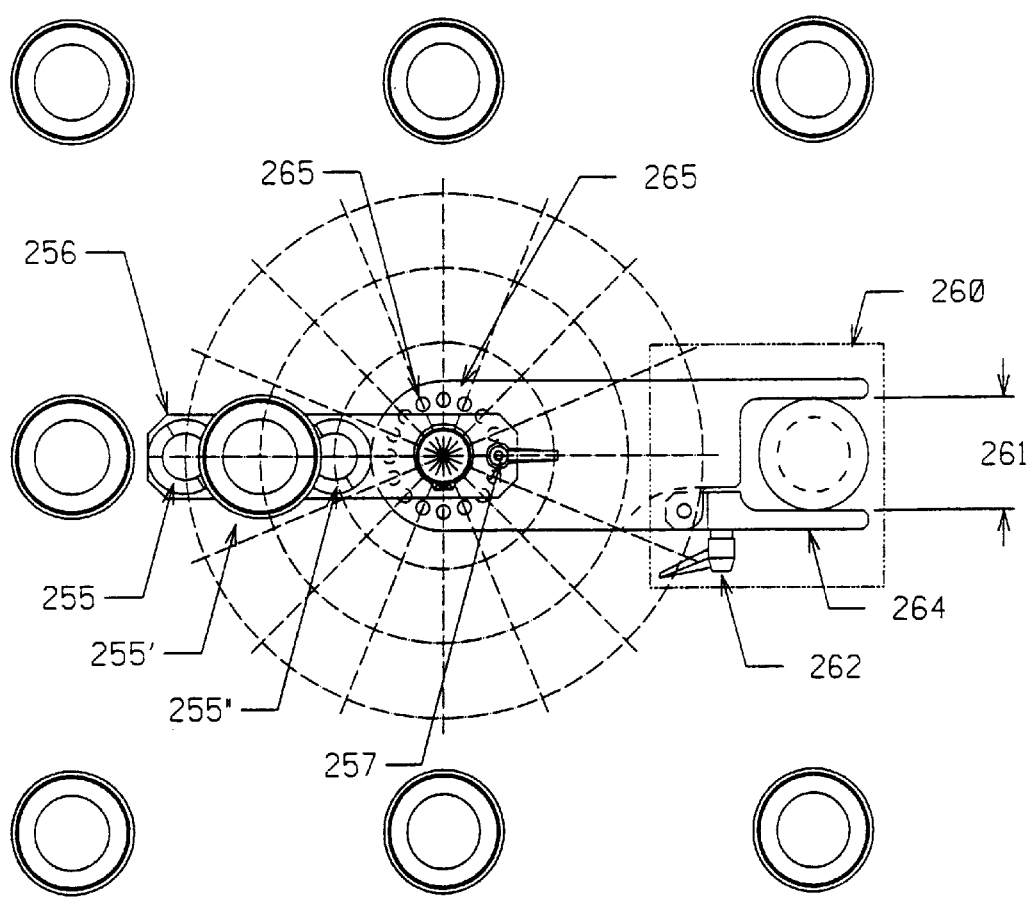
FIG. 15 is a top view of the extender of FIG. 14 as installed on an actuator table, illustrating the placement and positional movements thereof.

Referring now to FIGS. 14 and 15, which comprise side and top views respectively of an extension attachment which allows spacing of an actuator intermediate between two fixed locations, it will be observed that, in the preferred embodiment, a table has a series of fixed spaced locations which are adapted to receive actuators therein. However, it is possible that a particular application might require extra support between two given fixed table locations. Accordingly, referring to FIG. 14, an extender attachment includes first and second arm portions 254 and 256, wherein the first arm extension fits in engaging relation over a given actuator 258 above the table 202. The attachment is via a bayonet type mount which fits over the actuator piston body as extended. The first arm 254 extends from the actuator position to which attachment is made to an adjacent actuator and includes a clamp 260 which is secured and loosened by a tightening arm 262. Referring to FIG. 15, the clamp portion 260 includes a slot portion 262 which fits over the adjacent actuator and a finger portion 264 which, when tightened by operation of arm 262, provides a brace against rotation of the arm portion 254, so that the position of the extended actuator head is precisely maintained. Positioned every 22.5 degrees in the illustrated embodiment are locator holes 265, formed in the top of arm portion 254. The corresponding arm portion 256 has a cam lock expanding locating pin 257 which is adapted to mate with the corresponding hole 265 and, upon turning of a tightening lever, securely engaging the locating pin with its respective radial hole. Arm portion 256 includes three separate receiving positions 255, 255' and 255" which are spaced successively further from the mount position of the extender arm providing three separate radial locations along which an end effector may be positioned as illustrated in FIG. 15, every 22.5 degrees. Each individual site 255 also provides vacuum supply to the end effector and includes a check valve to prevent vacuum leak when that individual site is not in use.

An advantage provided the by flexible tooling system is that the support table need not be fully populated with actuators, since the actuators may be moved to different positions on the support table. Accordingly, the system flexibility is high, enabling multiple configurations, while not requiring the expensive of fully populating the table. Further, each actuator is essentially self contained, requiring only air, vacuum and electrical supply as well as instruction data. No external oil lines are required as the oil system is fully self contained. The construction is free from servo type components, allowing low current consumption, which simplifies the electrical supply demands made by a table populated with a large number of actuators.

While plural embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for supporting a component during tooling operations comprising the steps of:

providing a support table having a plurality of receiving positions thereon, ones of said receiving positions comprising an interface providing a pneumatic supply and an addressable bus interconnection; and removably inserting actuator mechanisms in a selected subset of said plurality of receiving positions and interfacing with said interface; and extending and retracting said actuator mechanisms to desired support positions as powered by said pneumatic supply in response to commands received via said addressable bus interconnection.

2. The method according to claim 1 further comprising supplying vacuum via said interface to ones of said actuators, and wherein said actuators supply vacuum to portions of said actuator mechanisms via said interface in response to commands received via said addressable bus interconnection.

3. The method according to claim 1 wherein said actuator mechanism comprises piston means and valve means operative in response to commands received via said addressable bus interconnection and further comprising supplying extend or retract commands to ones of said actuator mechanisms for directing said pneumatic supply to an extend side of said piston means or to a retract side of said piston means to effect extension or retraction of said actuator mechanism.

4. The method according to claim 1 wherein said actuator mechanism comprises locking means for locking said actuator in a current position and valve means operative in response to commands received via said addressable bus interconnection, further comprising directing said locking means to be in either a locked state or an unlocked state.

5. The method according to claim 4 wherein said locking mechanism is hydraulically actuated and wherein hydraulic fluid is supplied thereto via an internal channel of a body of an actuator mechanism, thereby removing the need for external hydraulic plumbing as a component of an actuator.

6. The method according to claim 1 wherein ones of said actuator mechanisms comprise a self contained hydraulic clamping system, wherein said actuator mechanisms require only, air, vacuum and electrical supplies as well as instructional data to function.

7. A method for supporting a component during tooling operations comprising the steps of:

providing a support table having a plurality of receiving positions thereon, ones of said receiving positions comprising an interface providing a pneumatic supply, an electrical supply, and an addressable bus interconnection;

removably inserting actuator mechanisms in a selected subset of said plurality of receiving positions and interfacing with said interface; and extending and retracting said actuator mechanisms to desired support positions as powered by said pneumatic supply in response to commands received via said addressable bus interconnection, ones of said actuator mechanisms comprising self contained hydraulic clamping systems responsive to said pneumatic supply for clamping and unclamping thereof.

8. A method for supporting a component during tooling operations comprising the steps of:

providing a support table having a plurality of receiving positions thereon; and removably inserting vertically oriented support members in a selected subset of said plurality of receiving positions, whereby the component tool is supported by said support members.

9. A method for supporting a component during tooling operations according to claim 8 wherein said receiving positions further comprise an interface providing a pneumatic supply, an electrical supply, a vacuum supply, and an addressable bus interconnection.

10. A method for supporting a component during tooling operations according to claim 9 wherein said vertically oriented support members comprise actuator mechanisms comprising a self contained hydraulic clamping system for clamping and unclamping thereof.

11. A method for supporting a component during tooling operations according to claim 10 wherein said actuator mechanisms extend and retract vertically to desired support positions as powered by said pneumatic supply in response to instructional data commands received via said addressable bus interconnection.

* * * * *